US009526021B2

(12) United States Patent
Salkini et al.

(10) Patent No.: US 9,526,021 B2
(45) Date of Patent: *Dec. 20, 2016

(54) INTELLIGENT NETWORK ACCESS CONTROLLER AND METHOD

(71) Applicant: TECORE, INC., Hanover, MD (US)

(72) Inventors: Jay Salkini, Columbia, MD (US); Thomas Joseph, Lothian, MD (US)

(73) Assignee: Tecore, Inc., Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/072,984

(22) Filed: Mar. 17, 2016

(65) Prior Publication Data

US 2016/0198354 A1 Jul. 7, 2016

Related U.S. Application Data

(63) Continuation of application No. 13/939,403, filed on Jul. 11, 2013, now Pat. No. 9,295,071, which is a
(Continued)

(51) Int. Cl.
*H04L 1/00* (2006.01)
*H04W 24/08* (2009.01)
*H04W 48/04* (2009.01)
*H04L 29/06* (2006.01)
*H04W 12/06* (2009.01)
*H04W 12/12* (2009.01)
*H04W 72/10* (2009.01)
*H04W 4/22* (2009.01)
*H04W 60/02* (2009.01)
(Continued)

(52) U.S. Cl.
CPC .............. *H04W 24/08* (2013.01); *H04L 63/08* (2013.01); *H04W 4/22* (2013.01); *H04W 12/06* (2013.01); *H04W 12/12* (2013.01); *H04W 48/04* (2013.01); *H04W 60/02* (2013.01); *H04W 72/10* (2013.01); *H04W 88/02* (2013.01); *H04W 88/12* (2013.01)

(58) Field of Classification Search
CPC ...... H04W 12/06; H04W 12/12; H04W 12/08; H04W 88/02; H04W 84/18; H04W 84/12; H04L 63/08
USPC ..... 370/310, 329, 341, 352; 455/411, 414.1, 455/455, 556, 565
See application file for complete search history.

(56) References Cited

U.S. PATENT DOCUMENTS 4,790,000 A * 12/1988 Kinoshita ............. H04W 16/14
455/449
5,278,890 A * 1/1994 Beeson, Jr. ........... H04W 68/00
340/7.24

* cited by examiner

Primary Examiner — Dady Chery

(57) ABSTRACT

An intelligent network access controller coupled to wireless communication hardware controls wireless communications in a targeted coverage area of a local wireless network overlaying an existing wireless network. The controller controls the hardware to provoke wireless devices within the targeted coverage area of the local wireless network to attempt to register with the intelligent network access controller; receives, through the hardware, registration signals and identification information from the wireless devices; locks the wireless devices to the intelligent network access controller; determines an access category for each of the wireless devices based on the received registration signals and identification information; maintains first access category wireless devices locked to the controller while the first access category wireless devices remain in the targeted coverage area of the local wireless network; and unlocks second category wireless devices by controlling the hardware to signal the second access category wireless devices to attempt access to the existing wireless network.

20 Claims, 7 Drawing Sheets

Related U.S. Application Data continuation of application No. 13/507,675, filed on Jul. 19, 2012, now Pat. No. 8,509,740, which is a continuation of application No. 12/318,020, filed on Dec. 19, 2008, now Pat. No. 8,437,741.

(51) Int. Cl.
*H04W 88/02* (2009.01)
*H04W 88/12* (2009.01)

INTELLIGENT NETWORK ACCESS CONTROLLER AND METHOD

RELATED APPLICATIONS

This application is a continuation of, and claims priority to: U.S. patent application Ser. No. 13/939,403, entitled "Intelligent Network Access Controller and Method," filed Jul. 11, 2013, which is a continuation of U.S. patent application Ser. No. 13/507,675, now U.S. Pat. No. 8,509,740, entitled "Intelligent Network Access Controller and Method," filed Jul. 19, 2012, which is a continuation of U.S. patent application Ser. No. 12/318,020, now U.S. Pat. No. 8,437,741, entitled "Intelligent Network Access Controller and Method," filed Dec. 19, 2008; the disclosures of these three applications are hereby incorporated by reference in their entirety.

TECHNICAL FIELD

The technical field is wireless communications.

BACKGROUND

A key performance indicator of any wireless network is coverage. In addition to providing an evolving set of features to customers, the most successful wireless networks are those that provide ubiquitous coverage and service to as broad a base of subscribers as possible. Because of the emphasis on coverage, these same networks seldom, if ever, provide methods of restricted or controlled access for targeted areas in the network. However, with heightened security concerns, and for other reasons, targeted wireless access restriction may be an important consideration, especially in a localized area, and/or for specific time periods.

SUMMARY

An intelligent network access controller for use within a targeted area or areas provides communications services across some or all relevant wireless technologies and spectrums to subscribers having wireless communications devices. The controller produces the targeted coverage area, wherein wireless access limitations may be enabled by using interfaces for receiving and sending digital messaging by the wireless communications devices; an identification module that determines an identity of a wireless communications device; an access module that receives the identity and determines an access level for the wireless communications device; and a locking module that implements logic that accepts, releases, or allows service to selected wireless communications devices to the controller based on the determined access level.

An intelligent network access controller coupled to wireless communication hardware controls wireless communications in a targeted coverage area of a local wireless network overlaying an existing wireless network. The controller controls the hardware to provoke wireless devices within the targeted coverage area of the local wireless network to attempt to register with the intelligent network access controller; receives, through the hardware, registration signals and identification information from the wireless devices; locks the wireless devices to the intelligent network access controller; determines an access category for each of the wireless devices based on the received registration signals and identification information; maintains first access category wireless devices locked to the controller while the first access category wireless devices remain in the targeted coverage area of the local wireless network; and unlocks second category wireless devices by controlling the hardware to signal the second access category wireless devices to attempt access to the existing wireless network.

DESCRIPTION OF THE DRAWINGS

The detailed description refers to the following figures in which like numerals refer to like items, and in which.

DETAILED DESCRIPTION

Figure 1:
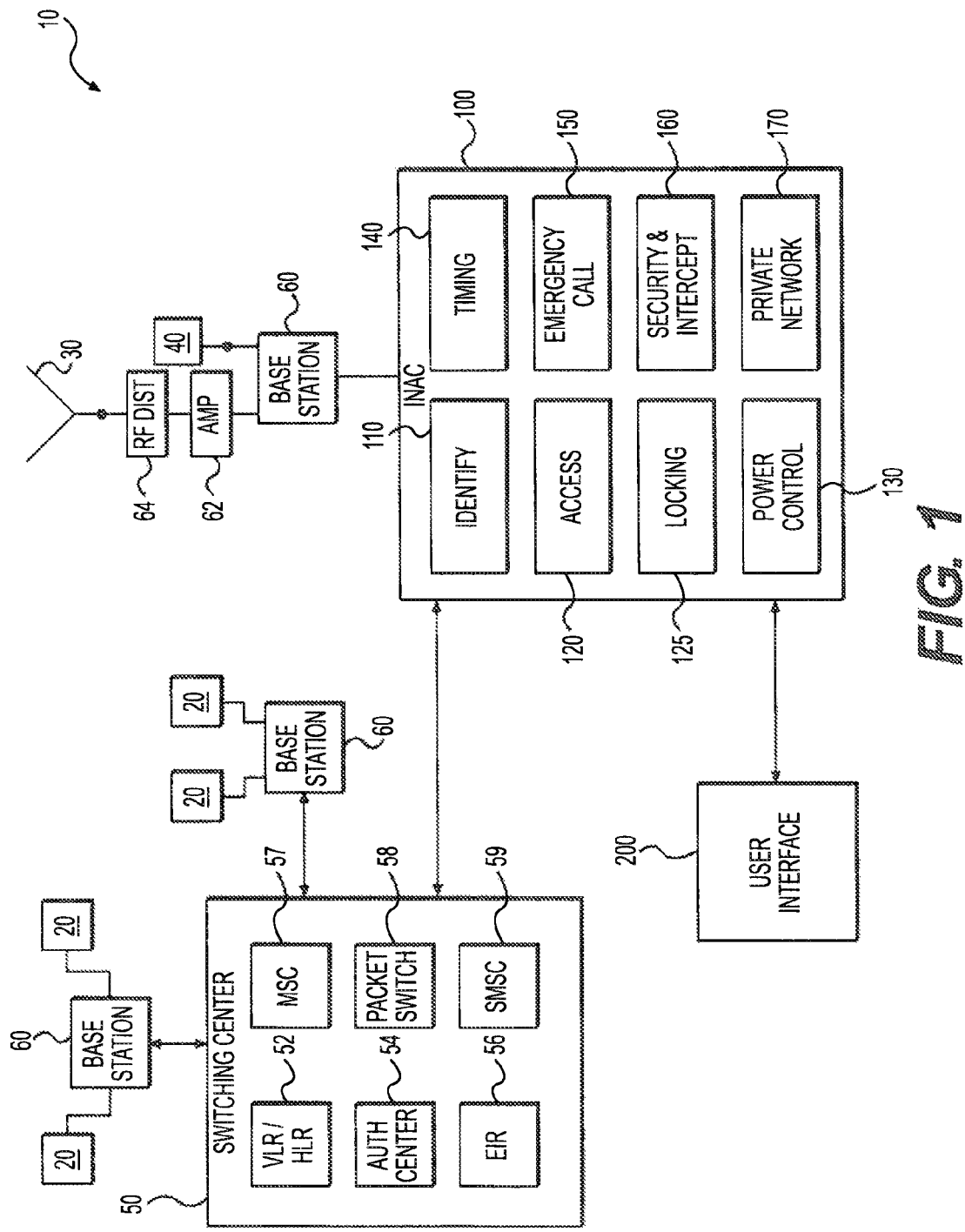
FIG. 1 is a block diagram of a wireless network incorporating an exemplary intelligent network access controller.

A key performance indicator of any wireless network is coverage. The most successful wireless networks are those that have ever-expanding coverage, independent of time, to provide ubiquitous service to any and all subscribers and roaming users. Because of the emphasis on coverage, these same networks seldom, if ever, operate so as to restrict access. However, with heightened security concerns, and for other reasons, wireless access restriction may be an important consideration, especially in a localized area, and/or for specific time periods.

Current systems that impose some type of wireless access restriction function may employ jamming equipment to block wireless signals in a particular area. Other systems rely on shutdown of a cell or sector. These current wireless access restriction solutions do not discriminate among users. Instead, these solutions impose a total prohibition on wireless communications. Furthermore, these current solutions are complicated and expensive to invoke. Finally, with these current solutions, if a situation requires that certain personnel (e.g., emergency response personnel) be able to communicate using wireless communications, a secondary communications network must be established since jamming or cell shutdown prohibits all wireless communications for a given wireless technology.

In most cases jamming works across a spectrum of radio frequencies and jams the use of the entire spectrum regardless of the wireless technology or technologies deployed in the spectrum. So in the case of jamming, a localized communications network must be established on its own technology, unique devices, and spectrum further complicating the setup and operations.

Another challenge is that in most areas covered by wireless communications there are typically multiple technologies operating in a variety of spectrum ranges. Jamming solutions and cell turn down are absolute solutions that do not provide the ability to select on a device by device basis the ability to use the wireless communication within the target area.

To overcome these limitations with current art wireless communication access restriction solutions, disclosed herein is an intelligent network access controller, and accompanying method, which is shown in FIGS. 6A-6D, that either permanently or temporarily limits allowable communications on an existing wireless network to only a subset of that network's normal users. Those users not in the subset of allowable users are blocked from access to the wireless network when located in a specified area normally covered by the wireless network and/or for a specified time.

The intelligent network access controller provides, on a single platform, the necessary components for an end-to-end solution for selective communications restriction across the spectrum of wireless technology, frequency, and access methodology. In an embodiment, wireless users are classified into categories and either allowed to access the wireless networks or are prohibited access, on a subscriber-by-subscriber basis. The intelligent network access controller meets the criteria of service restriction that may be required in specific areas, while allowing selected individuals wireless communications access to wireless networks in those same areas. Thus, the intelligent network access controller eliminates the need to overlay additional communications systems to provide targeted localized wireless communications. The intelligent network access controller implements its service across both commercial as well as private wireless networks.

The intelligent network access controller is particularly useful in certain permanent facilities such as embassies, government facilities, prisons, military installations, stadiums and arenas, hospitals, public transportation facilities, landmarks, and in temporary applications including disaster recovery operations and homeland security operations. In short, the intelligent network access controller can be used in any situation or at any facility or locale to establish a controlled wireless communications environment whereby only selected individuals can access a wireless communications network.

Figure 6A:
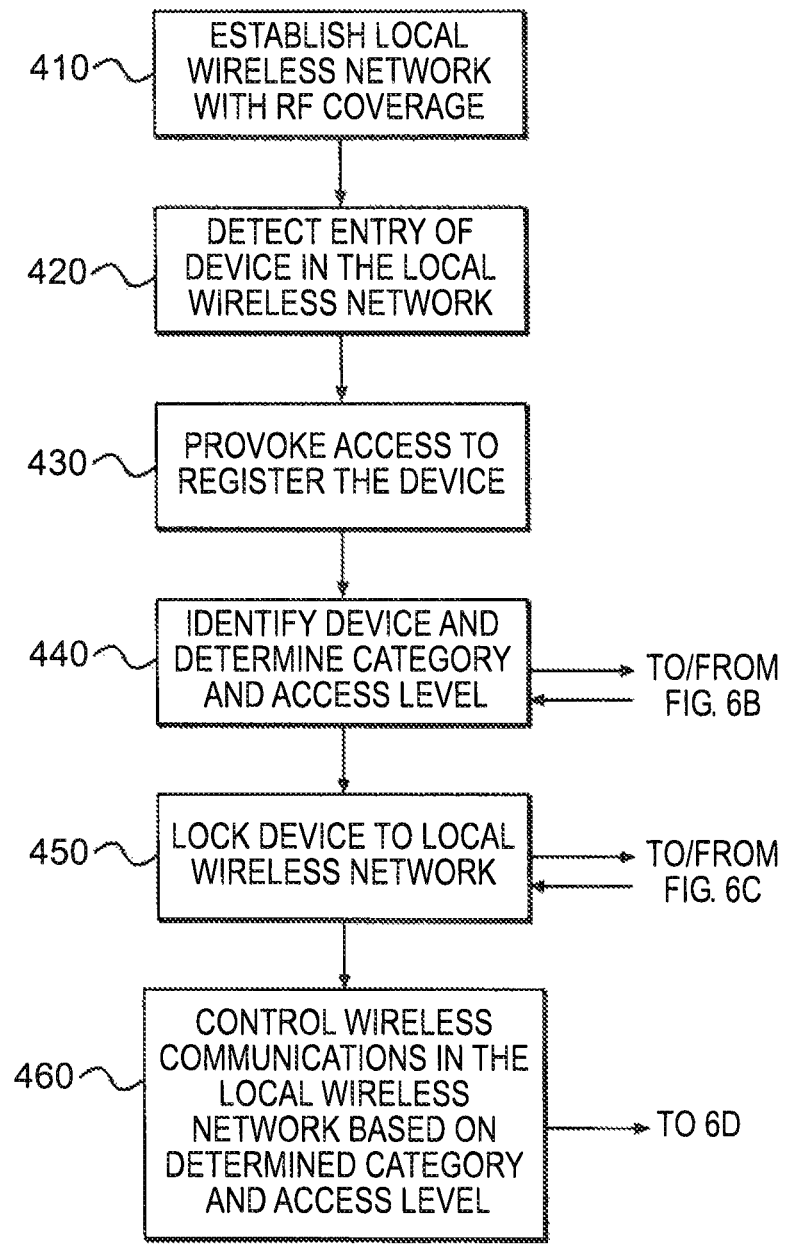
FIGS. 6A-6D illustrate an embodiment of a method for creating a local wireless network and for controlling wireless communications using the local wireless network.

FIG. 1 is a block diagram of a wireless communications network that incorporates an exemplary intelligent network access controller and other wireless network components to provide access restriction features. In FIG. 1, wireless network 10 includes switching center 50 and base stations 60, through which devices 20 establish wireless communications. Overlaying the network 10 are directional antennae 30 and repeaters 40 that operate in conjunction with intelligent network access controller (INAC) 100, to restrict or to allow wireless communication from and to selected devices 20. The switching center 50 includes standard components that may be found in any switching center, including a VLR and a HLR 52, authentication center 54, equipment identification register 56, a mobile switching center (MSC) 57, a packet switch 58 and a short message service center (SMSC) 59. Ordinarily, a subscriber using a device 20 would have that device 20 registered with the network 10 once the device 20 was within the coverage area of the network 10. However, to provide access restriction on either a temporary or a permanent basis, the INAC 100, and associated interface 200, which facilitates human operator interaction with the controller 100, may be used to "lock" selected devices 20 to the INAC 100, the method of which is shown in FIG. 6A, block 430, and thus prevent access to the wireless network 10.

"Locking" the wireless devices to the INAC 100 indicates that the wireless device 20 is tuned to and has been accepted by the local signal broadcast of the INAC 100. The INAC 100 implements a mimicked signal that may follow the signal patterns, parameters, and characteristics of the underlying wireless network; however—the localized signal is only connected to the INAC 100 and not the wireless network as a whole. The end result is a wireless device that has the appearance of operating on the wireless network; however by virtue of the wireless device 20 being tuned to the local INAC 100 signal, the wireless device 20 is by default "locked" from access to the wireless network outside the coverage area of the INAC 100.

A "device" or "wireless device" includes any wireless access mechanism including wireless handheld devices used for communications and laptop computers, personal digital assistants, or other computing device that includes wireless access technology.

A "wireless network" includes networks that provide commercial or private wireless access for voice, text, and or data access.

The INAC 100 may be implemented as an adjunct to the wireless network 10, as an integrated feature within the wireless network, or may be implemented as a standalone device that is independent of any specific wireless network.

The INAC 100 may be implemented as software, hardware, or a combination of hardware and software. The INAC 100 may be implemented on a suitably programmable processor.

Figure 6B:
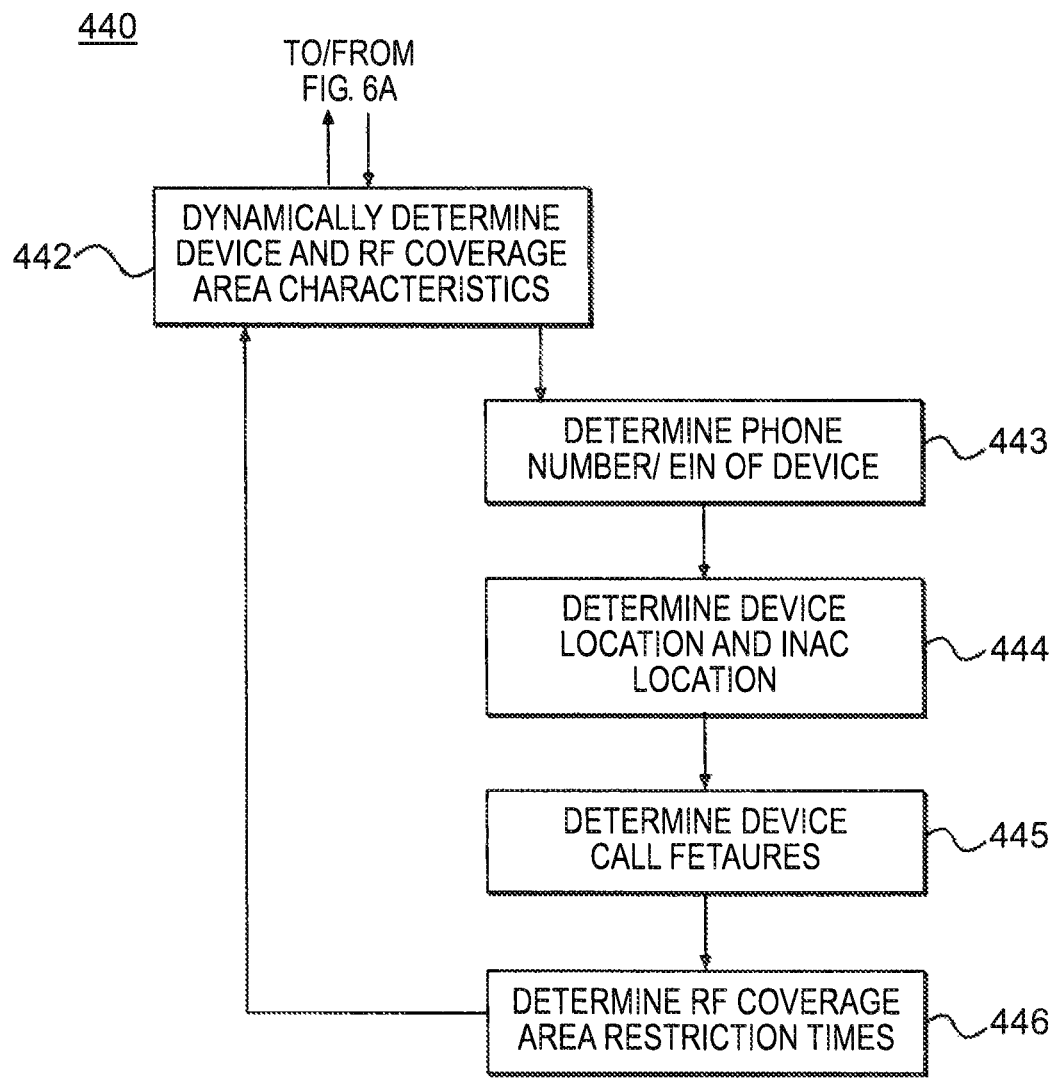
Figure 6C:
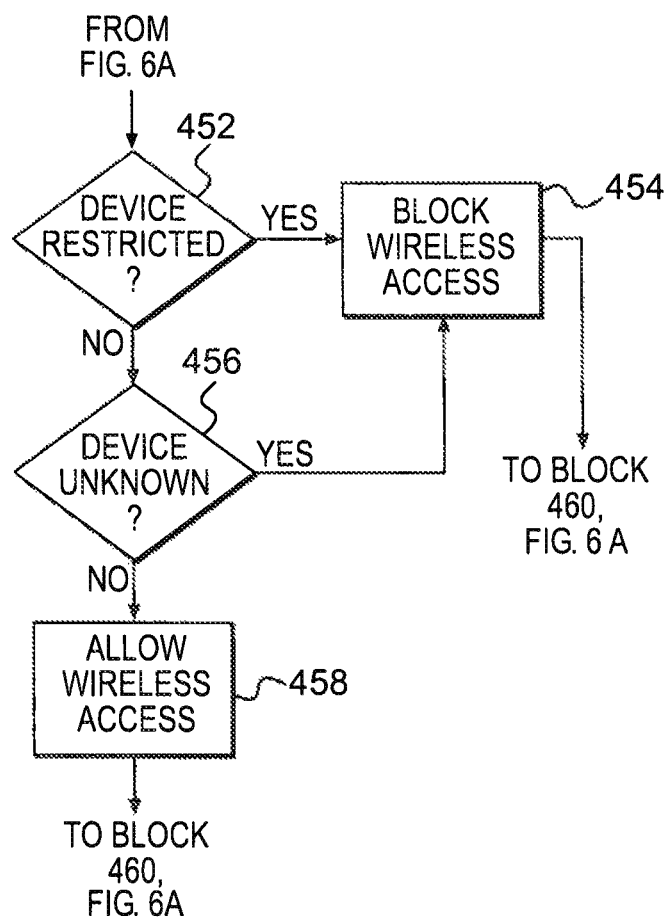
Figure 6D:
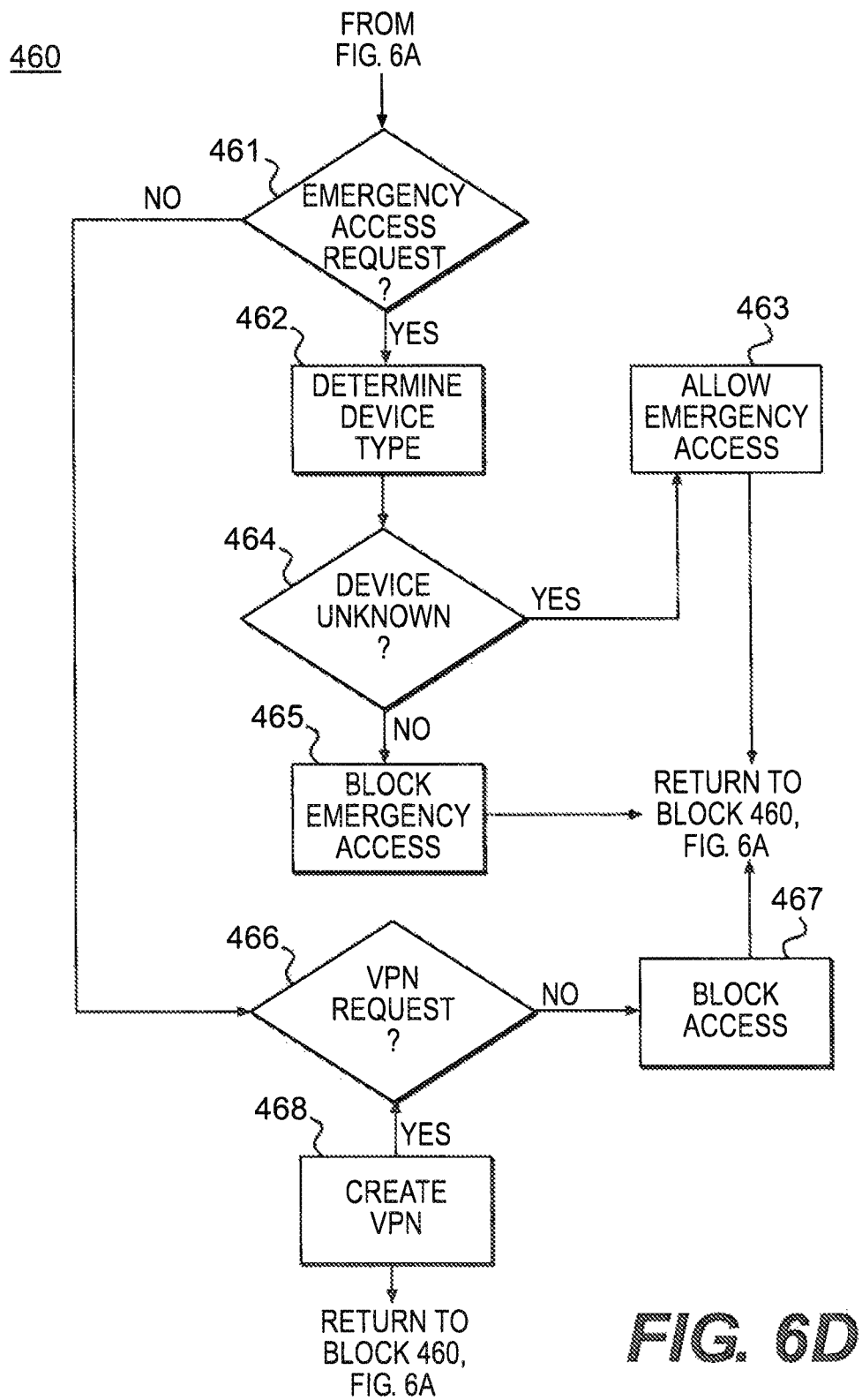

The INAC 100 includes equipment identity module 110 that receives and stores identifying information associated with devices 20, the method of which is shown in FIG. 6B, block 443; access module 120 that determines, based on setup or operational mode of the INAC 100, which of the devices 20 are to be allowed access to the wireless communications network 10; locking module 125, which is used to lock a device 20 to the INAC 100 and to provide indications to the locked device 20 that make it appear that the device 20 actually is registered with the wireless network 10; power control module 130, which operates in conjunction with base station 60, RF distribution equipment 62, amplifiers 64 directional antennae 30 and repeaters 40 to establish, per FIG. 6A, block 410, the area subject to the access restrictions imposed by the INAC 100; timing module 140, which may be used to impose temporal limitations on the access restriction functions per FIG. 6B, block 446; and emergency access module 150, which operates as shown in FIG. 6D, blocks 461-465, to allow certain access types (e.g., emergency 911 calls from a wireless device 20) while other access types remain blocked.

The INAC 100 provides, as shown in FIG. 6A, block 440 and FIG. 6B, blocks 442-445, discretionary blocking of access to and from devices 20 by recognizing differences among the devices 20. In an embodiment, the INAC 100 recognizes three categories of subscriber devices 20: restricted, allowed, and unknown. Restricted devices are those that are identified as belonging to subscribers who are to be denied wireless access (e.g., prisoners, terrorists). Restricted devices are configured by the INAC 100 so as not to be allowed cellular service and access to the wireless network 10. Every device 20 has a unique identifying number or characteristic, which is determined as shown in FIG. 6A, block 440. If the device identifying number or characteristic (e.g., subscriber number) is configured to be "restricted," the INAC 100 accepts that device's access and returns a positive acknowledgement to the device per FIG. 6C, block 452. This creates the illusion, at the subscriber's device 20, that the subscriber has gained access to and is operating within the wireless network 10, when, in fact, the device 20 is locked to the INAC 100 until the device 20 is removed from the restricted access area imposed by the INAC 100. By locking the "restricted" device 20 to the INAC 100, all incoming and outgoing accesses by the device 20 are prevented while the "restricted" device 20 is within the restricted access area, the method of which is shown in FIG. 6C, blocks 452 and 454.

Allowed devices are those configured in the INAC 100 as to be allowed wireless service. After determining the identity of the device 20, and determining that the device 20 is an "allowed" device, the INAC 100 redirects the device 20 from the INAC 100 to the appropriate wireless network 10, as shown in FIG. 6C, block 458. This redirection forces the "allowed" device to reattempt access on the wireless network 10. Once so redirected, the "allowed" device's subscriber can use the device 20 for normal inbound and outbound traffic. See FIG. 6A, blocks 420, 440, 450, and 460.

Unknown devices 20 are those not specifically configured by the INAC 100 as allowed or restricted. Unknown devices 20 may be configured to allow normal wireless network access depending, for example, on a security level requirement at a given location (e.g., for homeland security threat conditions of orange and lower, unknown devices are allowed access to the wireless network 10), as shown in FIG. 6C, blocks 454 and 456.

The INAC 100 operates as a local overlay or underlay of the same frequency spectrum and configuration as the wireless network 10. The area of restricted access can extend to any part of the coverage area of the wireless network 10, and such restricted area may be enforced by the use of the power control module 130, directional antennae 30, and repeaters 40. Thus, the restricted area under control of the INAC 100 may be limited to a building, a sports stadium, or a geographical area, for example. The area of restricted wireless access is not necessarily static, and can be changed based on set criteria or at the discretion of a network operator. The end result is a targeted coverage area that can provide controlled and deterministic wireless communications access by subscribers. Once a restricted, or an unknown, subscriber's device 20 leaves the restricted access area, the subscriber's device 20 re-registers with the wireless network 10 and is no longer controlled (locked) by the INAC 100.

When the subscriber's device 20 is locked to the INAC 100, the locking module 125 operates to ensure that the device's display and apparent operation are the same as if the device 20 were registered with the wireless network 10. A subscriber who attempts to use a device 20 locked to the INAC 100 will see a failed access attempt, or similar warning. The subscriber's perception would likely then be that the device 20 was not receiving sufficient signal strength to enable wireless communications or the serving wireless network did not have the requisite capacity to service the access request. This further masks the purpose and operation of the INAC 100. Only after a repeated pattern of access denial is established would the typical subscriber discern the restricted access.

The INAC 100 can be configured to provide various levels of access depending on the configuration of the subscriber devices 20 and the level of security required for the access. The INAC's operational mode may be changed dynamically, either automatically, or manually. Automatic changes may be programmed using the interface 200. Examples of automatic changes are changes programmed into the INAC 100 based on time of day, day of week, or some other calendar-based criteria; the occurrence of a specific event (e.g., a concert); changes in threat levels (e.g., homeland security threat conditions—yellow, orange, etc.); and changes in an operational profile or physical location (of the INAC 100 or of the wireless device 20) (e.g., an aircraft descending below 10,000 feet, a ship entering port, a train arriving at a station). Manual changes may be implemented directly by a system operator by using the interface 200. For any of the modes of operation, the INAC 100 provides a logging mechanism to track all system access attempts and the resulting status. Additionally the INAC 100 provides capability to view the existing database information including the allowed and restricted lists, system configuration, system statistics, and log of system activity.

Figure 2:
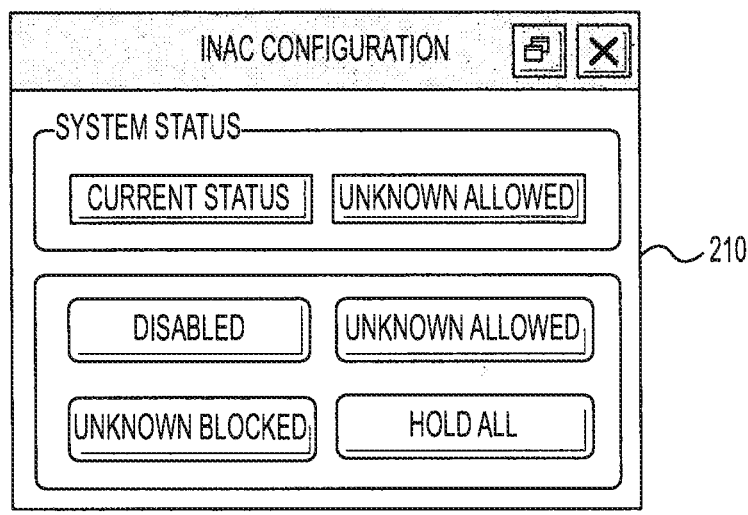
FIG. 2 illustrates an exemplary interface for enabling wireless access restrictions using the controller of FIG. 1.

The INAC's operational modes include disabled, wherein the access restrictions imposable by the INAC 100 are suspended; hold all, or virtual jam, wherein all wireless communications are processed as locked to the INAC 100; unknown allowed, wherein only known "restricted" devices are locked to the INAC 100; and unknown blocked, in which both restricted and unknown devices are locked to the INAC 100. FIG. 2 illustrates an exemplary interface 210 produced by the interface 200 and the INAC 100 for enabling wireless access restrictions. Additionally, the INAC 100 can also operate in a passive mode where all subscriber access is redirected to the appropriate wireless network.

As subscribers access the INAC 100, and either are locked to the INAC 100 or redirected to the wireless network 10, the INAC 100 captures access information that can be used to generate access reports for each type of device 20 (i.e., unknown, bad, or good). The reports provide an organized analysis as to which users are accessing the system, including time period, call duration, and frequency of use. The reports also provide useful information for establishing system databases and use of the INAC 100.

Figure 3:
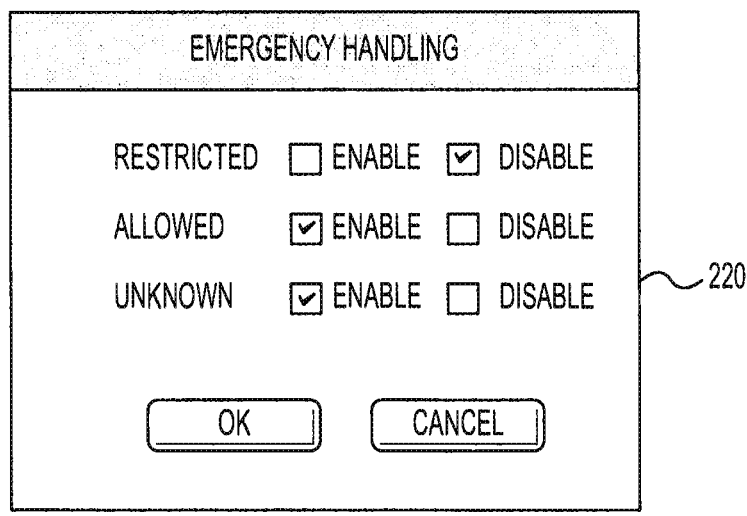
FIG. 3 illustrates an exemplary interface for enabling emergency access.

An optional feature of the INAC 100 is emergency access override to allow processing of emergency access, the method of which is shown in FIG. 6D, blocks 461-465. Depending on the type of installation and the security requirements, emergency access may need to be available, and thus may be enabled or disabled. Emergency access can be configured based on each type of subscriber device; restricted, allowed, or unknown. FIG. 3 is an interface 220 that allows a system operator to enable or disable emergency access for each of the three subscriber device types (restricted, allowed, and unknown). When emergency access is enabled, per FIG. 6D, blocks 461-465, the emergency access module 150 of the INAC 100 allows the subscriber's device 20 to be redirected to the wireless network 10 when that device 20 dials an emergency access number such as 911. Upon completion of the emergency access, the subscriber's device 20 returns to a locked to INAC condition, as appropriate. When emergency access is disabled, the INAC 100 ignores all call access from subscribers whose devices 20 are locked to the INAC 100.

The INAC 100 provides for location sensitive operations, an example of which, as noted above, involves an aircraft. The INAC 100 may be installed on an aircraft so that certain devices (e.g., those of crew members) may be used for wireless communications at any time. Alternatively, the INAC 100 may be used to control access to wireless communications based on the aircraft's location (latitude, longitude, and altitude) or any aspect or aircraft operation.

The INAC 100 may include an optional security and intercept module 160 that is used for lawful intercept of wireless communications using a direct Internet connection (or other available connection type) to a monitoring station. When enabled at the INAC 100, the security and intercept module 160 allows law enforcement personnel to monitor and record conversations and data transfers (packet and circuit), call signaling messages, accessed features, and SMS originated or terminated messages for targeted wireless devices that are currently locked to the INAC 100 and allowed localized services on the INAC 100 system.

There are many possible deployment options for the INAC 100. For example, the INAC 100 may be implemented as a permanent part of the wireless communications network 10. The INAC 100 also may be implemented as a standalone device that overlays one or more wireless communications networks so that all wireless communications in a specific location are capable of some form of access restriction. One example of this wireless feature is to establish an INAC 100 at a building, a facility, or a campus.

Installation of the INAC 100 as part of a network, or as a standalone device can be permanent or temporary. For example, the INAC 100 may be available as a mobile device, along with the necessary amplifiers, RF distribution, antennae and repeaters, so that a disaster recovery operation may invoke wireless access restrictions in the area where the disaster recovery is taking place. Upon completion of the disaster recovery operations, the access limitation area is disestablished.

When the INAC 100 operates to restrict wireless communications by way of a wireless network, there may still be a need to provide some form of private network communications in the wireless access limited area, the method of which is shown in FIG. 6D, blocks 466-468. To provide this additional functionality, the INAC 100 may include a private network module 170 that allows for limited wireless voice communications using either a commercial technology such as GSM or CDMA, or voice over IP (VoIP) technology, including session initiated protocol/unlicensed mobile access (SIP/UMA). As additional wireless technologies become viable, these can be added to the private network solution as well. The private network module 170 also allows for connection to a PBX or PSTN.

The INAC 100 may also provide the capability to individually access the locked wireless devices overtly or covertly thus allowing the exchange of information or enabling the ability to provoke action from the wireless device.

Figure 4:
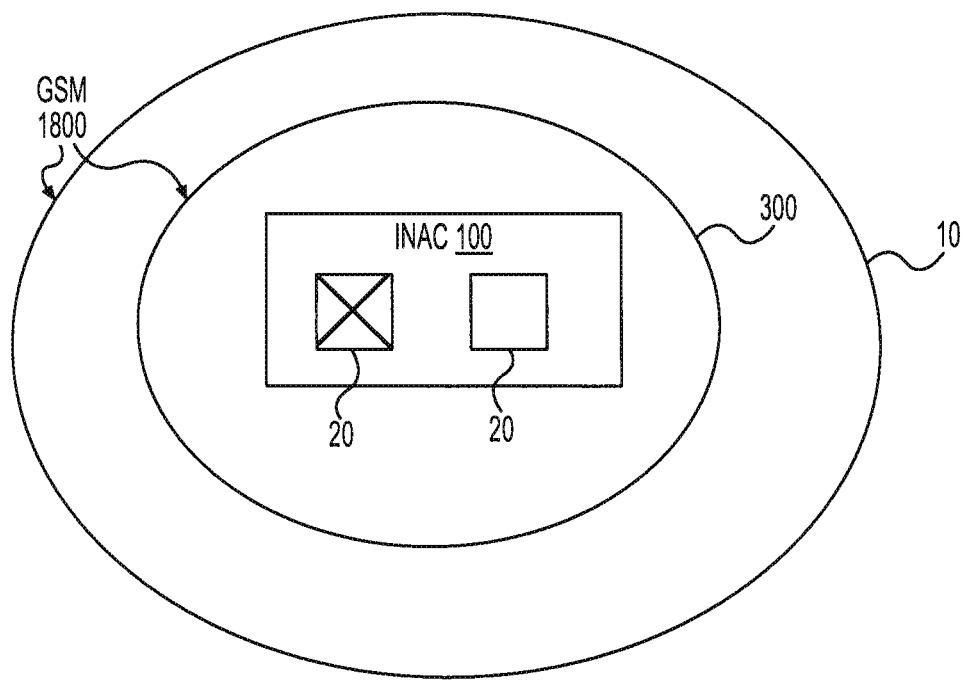
FIG. 4 illustrates a single technology implementation of the controller of FIG. 1.
Figure 5:
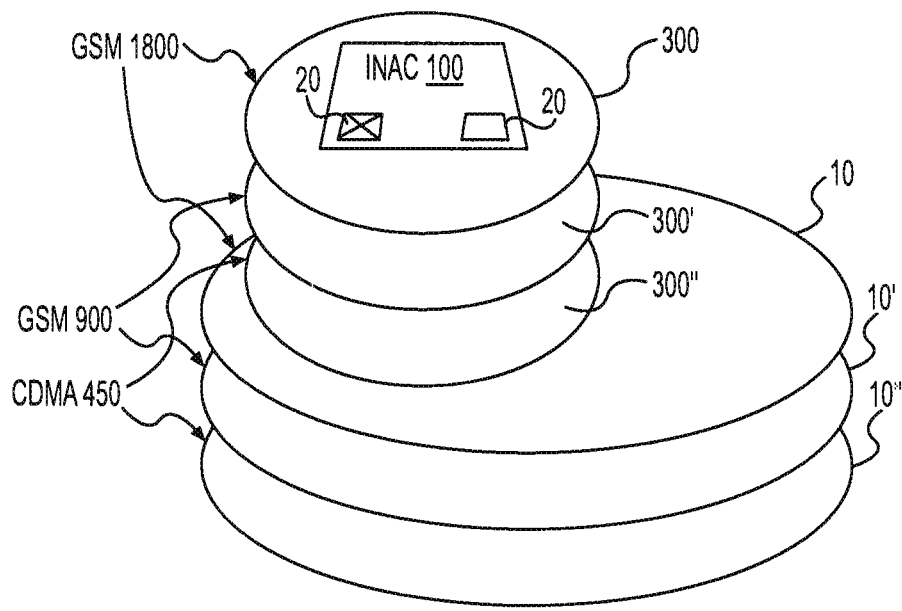
FIG. 5 illustrates a multiple technology implementation of the controller of FIG. 1.

As noted above, the INAC 100 may be used to control wireless access for one wireless technology, and/or for one frequency range, or for multiple technologies and frequency ranges. FIGS. 4 and 5 show this functionality, with examples of current wireless protocols illustrated. One skilled in the art will appreciate that other protocols would apply equally, including wireless protocols to be developed in the future. In FIG. 4, the INAC 100 is used to create restricted wireless access area 300 as an overly to wireless network 10, where the wireless network 10 and the restricted access area 300 are based on GSM 1800 protocols. In FIG. 5, three wireless technologies are shown and, correspondingly, three restricted access areas (300, 300', 300"). In a further alternative, the INAC 100 may be used to create restricted access areas for only a subset of the protocols of a multi-protocol wireless network.

FIGS. 6A-6D illustrate an embodiment of a method for creating a local wireless network and for controlling wireless communications using the local wireless network.

We claim:

1. A method implemented by an intelligent network access controller coupled to wireless communication hardware for controlling wireless communications in a targeted coverage area of a local wireless network overlaying an existing wireless network, comprising the intelligent network access controller:

controlling the hardware to provoke wireless devices within the targeted coverage area of the local wireless network to attempt to register with the intelligent network access controller;

receiving, through the hardware, registration signals and identification information from the wireless devices;

locking the wireless devices to the intelligent network access controller;

determining an access category for each of the wireless devices based on the received registration signals and identification information;

maintaining first access category wireless devices locked to the intelligent network access controller while the first access category wireless devices remain in the targeted coverage area of the local wireless network; and unlocking second category wireless devices by controlling the hardware to signal the second access category wireless devices to attempt access to the existing wireless network.

2. The method of claim 1, further comprising the intelligent network access controller:

allowing limited wireless communications access for the first category wireless devices, wherein the intelligent network access controller controls the hardware to generate signals to:

direct the first access category wireless devices to attempt registration with the existing wireless network for a specific communication, and redirect the first access category wireless device to re-register with the intelligent network access controller after completion of the specific communication.

3. The method of claim 1, further comprising the intelligent network access controller establishing the targeted coverage area and the local wireless network.

4. The method of claim 3, wherein local wireless network overlays less than an entire coverage area of the existing wireless network.

5. The method of claim 1, wherein the targeted coverage area is less than an area of the local wireless network.

6. The method of claim 1, wherein the intelligent network access controller establishes multiple targeted coverage areas, the multiple targeted coverage areas corresponding to different wireless technologies.

7. The method of claim 1, wherein the intelligent network access controller establishes multiple targeted coverage areas, wherein at least one of the multiple targeted coverage areas is different in geographic coverage from the other multiple targeted coverage areas.

8. The method of claim 1, wherein the first access category wireless devices comprise known, restricted wireless devices and unknown wireless devices, and the second category wireless devices comprise known, unrestricted wireless devices.

9. The method of claim 1, further comprising, upon receiving a registration signal from a wireless device, providing a positive acknowledgement to the wireless device thereby creating an illusion to a user of the wireless device that the wireless device is registered with and operating on the existing wireless network.

10. The method of claim 1, wherein the targeted coverage area exists in three dimensions.

11. The method of claim 1, wherein the hardware comprises one or more base stations, switching centers, and antennae.

12. A system for controlling communications in a targeted coverage area overlaying an existing wireless network, comprising:

wireless communications distribution hardware; and an intelligent network access controller coupled to the wireless communications distribution hardware, comprising:
an equipment identity module that receives and stores information identifying wireless devices that enter the targeted coverage area, and
access and locking modules that determine which of the wireless devices in the targeted coverage area are allowed access to the existing wireless network by:
establishing an attraction process that provokes the wireless devices within the targeted coverage area to register with the intelligent network access controller;
locking the registered wireless devices to the intelligent network access controller; and
establishing access limitations for the registered wireless devices, comprising:
preventing wireless communication access for first category wireless devices, wherein the intelligent network access controller provides to the first category wireless devices, an appearance of operating on the wireless network, and
allowing unlimited wireless communications for second category wireless devices, wherein the intelligent network access controller redirects the second category wireless devices to attempt registration with the existing wireless network.

13. The system of claim 12, further comprising:
allowing limited wireless communications access for the first category wireless devices, wherein the intelligent network access controller:
directs the first category wireless devices to attempt registration with the existing wireless network for a specific communication; and
upon completion of the specific communication, redirects the second wireless device to re-register with the intelligent wireless network access controller.

14. The system of claim 13, wherein the specific communication is an emergency communication carried over the existing wireless network.

15. The system of claim 13, wherein the intelligent network access controller further comprises a private network module used to establish a private network within the targeted coverage area, and wherein the specific communication is carried over the private network.

16. A system for dynamically controlling wireless communications in a targeted coverage area overlaying a portion of an existing wireless network, comprising a non-transitory computer-readable storage medium having encoded thereon a program of instructions that, when executed by a controller, cause the controller to:
establish an attraction process that provokes wireless devices within the targeted coverage area overlaying the portion of the existing wireless network to attempt to register with the controller,
receive a registration signal from a wireless device;
lock the wireless device to the controller;
determine an access category for the wireless device;
block wireless communication access on the existing wireless network for first category wireless devices within the targeted coverage area; and
allow unlimited wireless communications on the existing wireless network for second category wireless devices within the targeted coverage area, wherein the controller redirects the second category wireless devices to attempt registration with the existing wireless network.

17. The system of claim 16, further comprising the controller allowing limited wireless communications access for first category wireless devices, wherein the controller:
directs the first category wireless devices to attempt registration with the existing wireless network for a specific communication; and
after completion of the specific communication, redirects the first category wireless device to re-register with the controller.

18. The system of claim 16, wherein the controller establishes the targeted coverage area as the overlay to the portion of the existing wireless network.

19. The system of claim 16, wherein the controller provides to the first category wireless devices, an appearance of operating on the existing wireless network.

20. The system of claim 16, wherein the first category wireless devices are known, restricted wireless devices and the second category wireless devices are known, unrestricted wireless devices and unknown wireless devices.

* * * * *